United States Patent

[11] 3,589,740

| [72] | Inventor | Barry Owen Beach<br>Castle, Bromwich, Birmingham, England |
|---|---|---|
| [21] | Appl. No. | 707,905 |
| [22] | Filed | Dec. 8, 1967<br>Division of Ser. No. 353,415, Mar. 20, 1964,<br>Patent No. 3,414,449. |
| [45] | Patented | June 29, 1971 |
| [73] | Assignee | Dunlop Rubber Company Limited<br>London, England |

[54] FLEXIBLE DIAPHRAGMS
1 Claim, 6 Drawing Figs.

[52] U.S. Cl. ............................................. 277/212
[51] Int. Cl. ............................................. F16j 15/00
[50] Field of Search ........................................... 242/2, 3;
156/173; 277/212, 212 C, 212 FB

[56] References Cited
UNITED STATES PATENTS

| 3,083,734 | 4/1963 | Taplin | 92/103 |
| 3,279,832 | 10/1966 | Bergman | 277/212 FB X |
| 2,858,992 | 11/1958 | Wentz | 242/2 |
| 2,966,935 | 1/1961 | Wiltshire | 242/2 X |
| 3,133,236 | 5/1964 | McCauley | 242/3 |
| 3,367,586 | 2/1968 | Eshbaugh | 242/2 |

FOREIGN PATENTS

| 953,916 | 4/1964 | Great Britain | 277/212 C |

*Primary Examiner*—Laverne D. Geiger
*Assistant Examiner*—Robert I. Smith
*Attorney*—Rauber & Lazar ABSTRACT: A fluid-retaining seal for use as a fluid spring is provided which is cup shaped and consists of resilient material reinforced with cords which extend along the sidewalls and cordally cross the end wall.

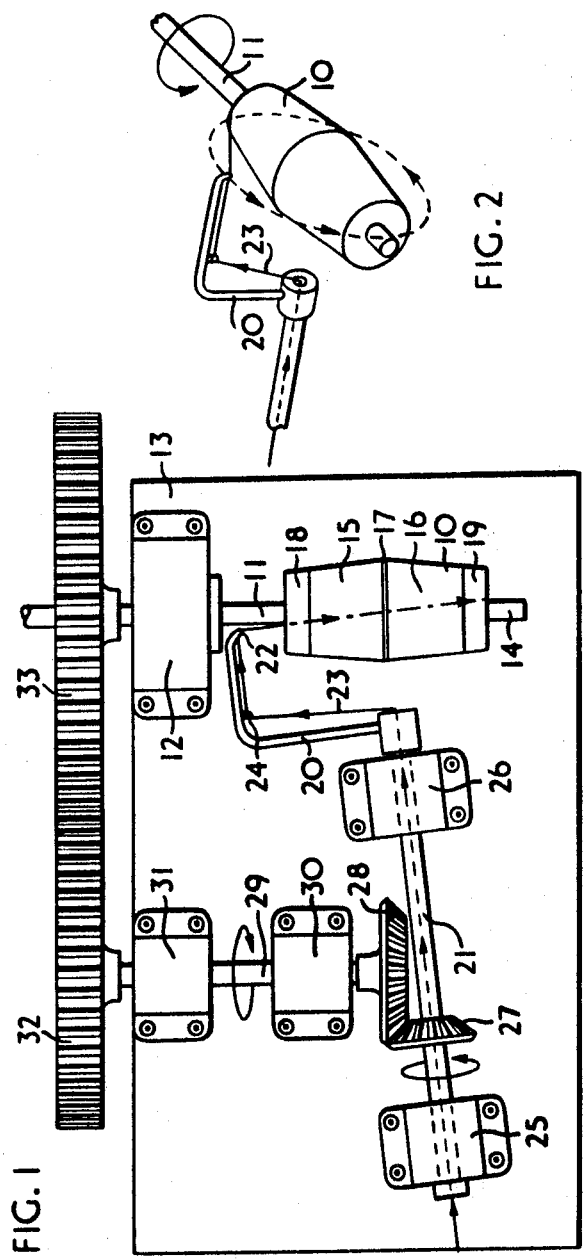

FLEXIBLE DIAPHRAGMS

This application is division of Ser. No. 353,415 filed Mar. 20, 1964 and now U.S. Pat. No. 3,414,449.

This invention relates to flexible diaphragms, and to methods and apparatus for the manufacture thereof.

Flexible diaphragms for use as fluid-retaining seals or as containers for pressurized fluid, for example as fluid springs for vehicle suspension systems, may be made from rubber reinforced with filamentary material such as nylon.

One object of the invention is to provide an improved method and apparatus for manufacturing a resilient diaphragm, and a further object of the invention is to provide an improved resilient diaphragm.

According to the invention, a method of manufacturing a resilient diaphragm comprises winding filamentary material around a rotating former, the filamentary material being laid on the former so that each turn of the material around the former lies in a plane which is inclined relative to the axis of rotation of the former, the former being rotated about its axis at a predetermined speed relative to the speed at which the material is applied thereto so that the filamentary material progressively extends over the former surface, continuing the winding process to produce a double layer of filamentary material on the former in which all regions of the layer have lengths of material disposed in two directions at opposite angles relative to the axis of the former, removing the would filamentary material from the former after unvulcanized elastomeric material has been applied to the filamentary material at any previous stage of the process to hold the filamentary material in its wound form, and shaping the would filamentary material into cup-shaped form.

The method defined above may be used to produce, by severing along the equatorial line of the former, two cup-shaped reinforcements which may each be coated with rubber and moulded to form a diaphragm having, for example, the shape of a top hat. Preferably the rubber coating is applied before severing the wound material on the former.

Alternatively, the reinforcement may be severed at any other suitable point to enable it to be removed from the former; for example it may be severed at one end of the former.

In a modified form of the method in accordance with the invention, a collapsible former may be employed, to enable the reinforcement to be removed without severing the cords. In this case, a cup-shaped reinforcement may be produced by first winding a barrel-shaped reinforcement, removing it from the former, and collapsing one end of the reinforcement into the opposite end to form a cup shape.

The invention also provides apparatus for use in the method described above comprising a former and a winding device, the former being barrel-shaped and having an equatorial groove. The former may be provided at its ends with soft rubber shoulders to assist in holding the turns of filamentary material in position.

According to a further aspect of the invention a flexible diaphragm comprises a reinforcement produced by the use of a method as defined above.

A method in accordance with the invention for manufacturing a small rolling-lobe diaphragm will now be described with reference to the accompanying drawings, in which:

FIG. 1 is a plan view of a rotatable former and associated winding apparatus;

FIG. 2 is a diagrammatic perspective view of part of the apparatus shown in FIG. 1;

Figure 3:
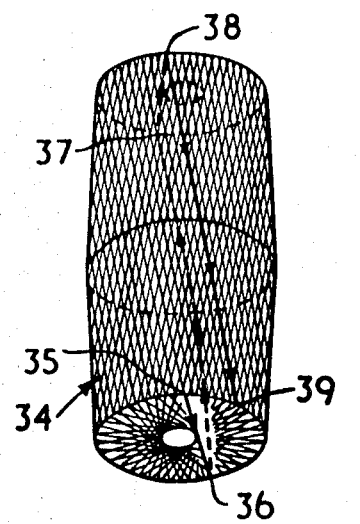
FIG. 3 is a diagrammatic perspective view of a would, barrel-shaped reinforcement.

A generally barrel-shaped aluminum former 10 is carried on a spindle 11 which is rotatably supported in cantilever fashion by bearings 12 mounted in a supporting framework 13 and is drivable by an electric motor (not shown) connected to the spindle 11 via a reduction gear (not shown). The spindle 11 is of small diameter relative to the diameters of the ends of the former, and its outer and 14 projects slightly beyond the associated end of the former. The former consists of two similar portions 15 and 16 which each have a shape dependent upon the shape of the diaphragm required, in this instance a truncated cone. The portions 15 and 16 are joined to one another at their bases, the line of junction on the former surface between the two truncated conical portions constituting the equatorial line of the former 10. A narrow groove 17 is machined in the former along this line.

The ends of the formers are provided with recesses in which soft rubber rings 18 and 19 are located to constitute the shoulders of the formers.

A winding device is positioned adjacent to the former. The winding device consists of an L-shaped winding arm 20 fixed at one end to a driving shaft 21 and carrying at the other end an eye 22 through which nylon cord may be fed to the former. The winding arm 20 and its driving shaft 21 are arranged so that on rotation of the driving shaft the eye 22 at the outer end of the arm is moved in a path which encircles the former and lies in a plane which is inclined at an acute angle to the axis of the former. The driving shaft 21 is hollow to enable cord 23 to be fed from a storage spool (not shown) through the shaft to the eye 22 and thence to be wound around the former. An intermediate eye 24 is provided at the elbow of the winding arm to guide the cord.

The driving shaft 21 of the winding device is carried in bearings 25 and 26 and is drivably connected by a pair of bevel gears 27 and 28 to a shaft 29 supported in bearings 30 and 31. The shaft 29 is connected by spur gears 32 and 33 to the former shaft 11. The overall ratio of the gears through which the shaft 21 is driven is chosen so that when the winding arm 20 makes a complete turn around the former 10, the former rotates through a predetermined angular distance.

The operation of the apparatus to produce a diaphragm reinforcement 34 (see FIG. 3) is as follows:

Nylon cord 23 which has been suitably treated to enable it to be bonded to rubber is led from a storage spool through the hollow shaft 21 of the winding device and the eyes 22 and 24 on the winding arm, and its end is secured to the former spindle. The surface of the former is coated with a releasing agent to assist the subsequent removal of the completed reinforcement.

The winding device and former are then both driven at a relative speed determined by the overall gear ratio, the cord being laid on the former by the rotation of the outer end of the winding arm around the former as illustrated in FIG. 2. In each revolution of the winding arm the cord passes from a point 35 (see FIG. 3), across one end of the former to point 36, along the curved surface of the former, in a direction inclined at an acute angle to the axis of the former to point 37, the cord then passing across the opposite end of the former to point 38 and returning to a point 39 which is displaced from its starting point 35 on the former as a result of the angle through which the former rotates during each revolution of the winding arm.

A layer of cord is thus gradually built up on the former and when the former has been completely covered the winding is stopped.

The effect of winding in the manner described above is to produce a double layer of cord in all regions of which lengths of cord cross one another at opposite bias angles relative to the axis of the former.

The layer of cord on the former is coated with rubber solution, which is allowed to dry. A thin sheet of unvulcanized rubber is then applied to the layer of cord on the former and consolidated in position by rotating the former and pressing a roller against the outer surface of the sheet.

Figure 4:
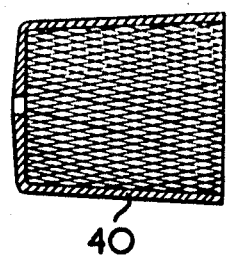
FIG. 4 is an axial cross-sectional view of an unmoulded diaphragm comprising a severed half of the reinforcement shown in FIG. 3, coated with rubber.

The rubberized cord layer on the former is separated into two similar cup-shaped structures 40, one of which is shown in FIG. 4, by rotating the former and holding a knife at the midpoint of the former, the edge of the knife blade entering the equatorial groove 17 of the former to sever the cords.

Figure 5:
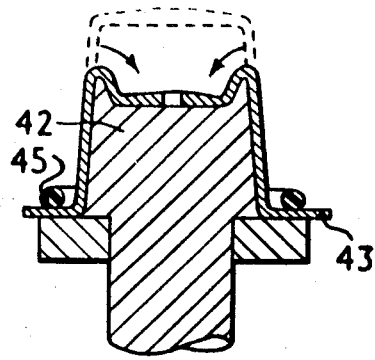
FIG. 5 is a diagrammatic axial cross-sectional view of an unmolded diaphragm mounted on the male part of a mould.
Figure 6:
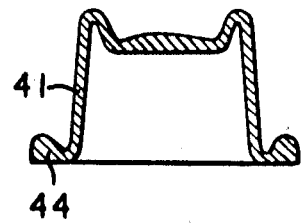
FIG. 6 is a diagrammatic axial cross-sectional view of a moulded diaphragm.

Each cup-shaped structure 40 is then removed from the former and used in the production of a flexible diaphragm 41 (see FIG. 6) as follows:

The cup-shaped structure 40 is fitted, as in FIG. 5 shown in dotted lines over a male former 42 of the required profile to shape the interior of the diaphragm. The rim 43 of the structure 40 is turned outwardly to form a reinforcement for a flange 44 to be provided on the finished diaphragm and the structure 40 is pressed down to the position shown in full lines in FIG. 5. A semicured rubber bead ring 45 is placed around the former 42 over the outwardly turned portion of the reinforcement and the assembly is inserted into a two-part mould. Pressure and heat are then applied to the mould to mould and vulcanize the diaphragm to the finished form shown in FIG. 6.

The method and apparatus described above have the advantage that they enable two diaphragm reinforcements to be produced from a single winding of cord. The process can be carried out quickly, and this enables diaphragms to be produces at a low cost.

Although the method and apparatus described above are used to produce diaphragms of tophat shape, by changing the shapes of the former and the mould, diaphragms of various configurations can be produced.

In an alternative method in accordance with the invention, a layer of unvulcanized rubber is applied to the former surface before winding the cord around the former. In this case the soft rubber shoulder rings are not required, since the cords are held in position by the rubber layer.

Where the diaphragms produced by the method described above are to be used for applications, for example as motor car suspension diaphragms, in which large deflections of high frequency are encountered, it is desirable to coat the cord before winding with a thin layer of rubber to help to avoid chafing of the cords in the finished diaphragm.

Having now described my invention —what I claim is:

1. A cup-shaped flexible diaphragm comprising a circular end wall portion of resilient material merging at its edge with an axially extending sidewall portion, and a two-layer reinforcement incorporated in said resilient material consisting solely of individual cords each extending along the sidewall portion and chordally across the end wall portion, the cords being arranged so that the chordally extending parts thereof are evenly angularly spaced around the axis of the diaphragm and each extend substantially in a common plane with parts of the respective cord extending along the sidewall portions one from each end of the chordally extending parts, the said common plane being disposed at an acute angle to the axis of the diaphragm.